(12) United States Patent
Fayyad et al.

(10) Patent No.: US 7,979,186 B2
(45) Date of Patent: Jul. 12, 2011

(54) TORQUE CONVERTER CLUTCH APPLY ADAPT AND QUALITY APPLY DETECTION CONVERTER SLIP ACCELERATION

(75) Inventors: Haytham A. Fayyad, Dexter, MI (US); William R. Mayhew, Ann Arbor, MI (US)

(73) Assignee: GM Global Technology Operations LLC

( * ) Notice: Subject to any disclaimer, the term of this patent is extended or adjusted under 35 U.S.C. 154(b) by 713 days.

(21) Appl. No.: 11/829,224

(22) Filed: Mar. 4, 2008

(65) Prior Publication Data

US 2009/0227422 A1    Sep. 10, 2009

(51) Int. Cl.
*F16H 61/48*    (2006.01)
*B60W 10/02*    (2006.01)
*G01M 13/02*    (2006.01)

(52) U.S. Cl. ............... 701/67; 701/68; 477/176

(58) Field of Classification Search .............. 701/67, 701/68; 477/176, 57, 53, 61; 192/3.33; 290/40 R
See application file for complete search history.

(56) References Cited

U.S. PATENT DOCUMENTS

| | | | |
|---|---|---|---|
| 6,036,619 A * | 3/2000 | Tashiro et al. | 477/64 |
| 6,565,483 B2 * | 5/2003 | Segawa et al. | 477/174 |
| 6,780,140 B2 * | 8/2004 | Okamoto et al. | 477/62 |
| 6,928,357 B2 * | 8/2005 | Higashimata et al. | 701/87 |
| 2005/0261111 A1 * | 11/2005 | Kurogo et al. | 477/169 |
| 2009/0192017 A1 * | 7/2009 | Lee | 477/169 |

* cited by examiner

*Primary Examiner* — Tan Q Nguyen

(57) ABSTRACT

A torque converter clutch slip rate monitoring system includes a slip rate calculation module that receives a raw slip speed of a torque converter clutch and that calculates torque converter clutch slip acceleration based on the raw slip speed. A torque converter clutch slip rate monitoring module detects deviation of the slip acceleration from a predetermined range during a pulldown of the torque converter clutch.

26 Claims, 9 Drawing Sheets

TORQUE CONVERTER CLUTCH APPLY ADAPT AND QUALITY APPLY DETECTION CONVERTER SLIP ACCELERATION

FIELD

The present disclosure relates to monitoring performance of a torque converter clutch in a motor vehicle.

BACKGROUND

The statements in this section merely provide background information related to the present disclosure and may not constitute prior art.

Figure 1:
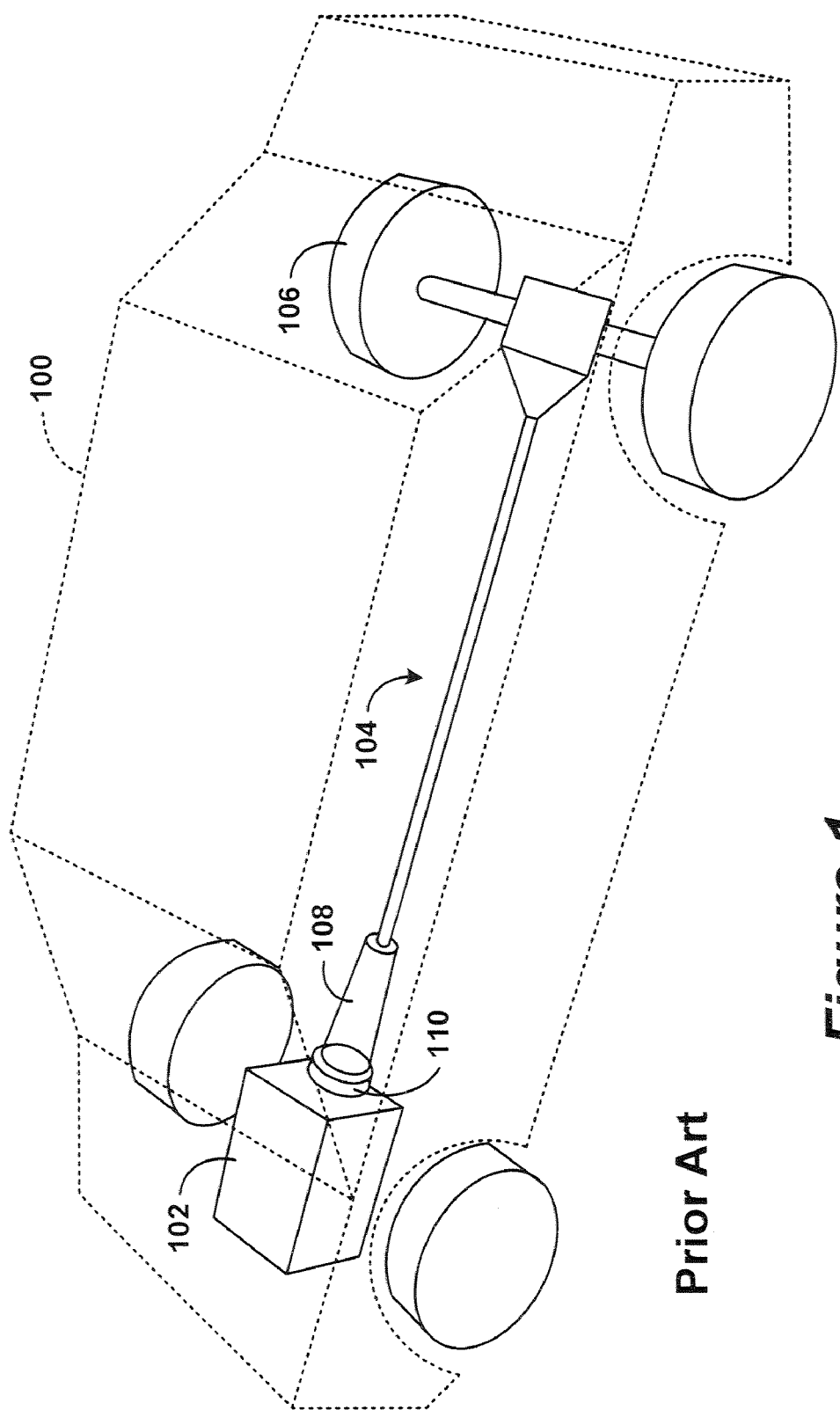

Starting with FIG. 1, vehicles traditionally include a power plant, such as an internal combustion engine 102, that generates drive torque. The drive torque is transferred through a powertrain and a driveline 104 to a driven wheel or wheels 106, which propel the vehicle along a surface. The powertrain 104 often includes an automatic transmission 108 that is coupled to the engine 102 by a torque converter 110, which is a type of fluid coupling, which allows the engine 102 to spin somewhat independently of the transmission 108.

Figure 2:
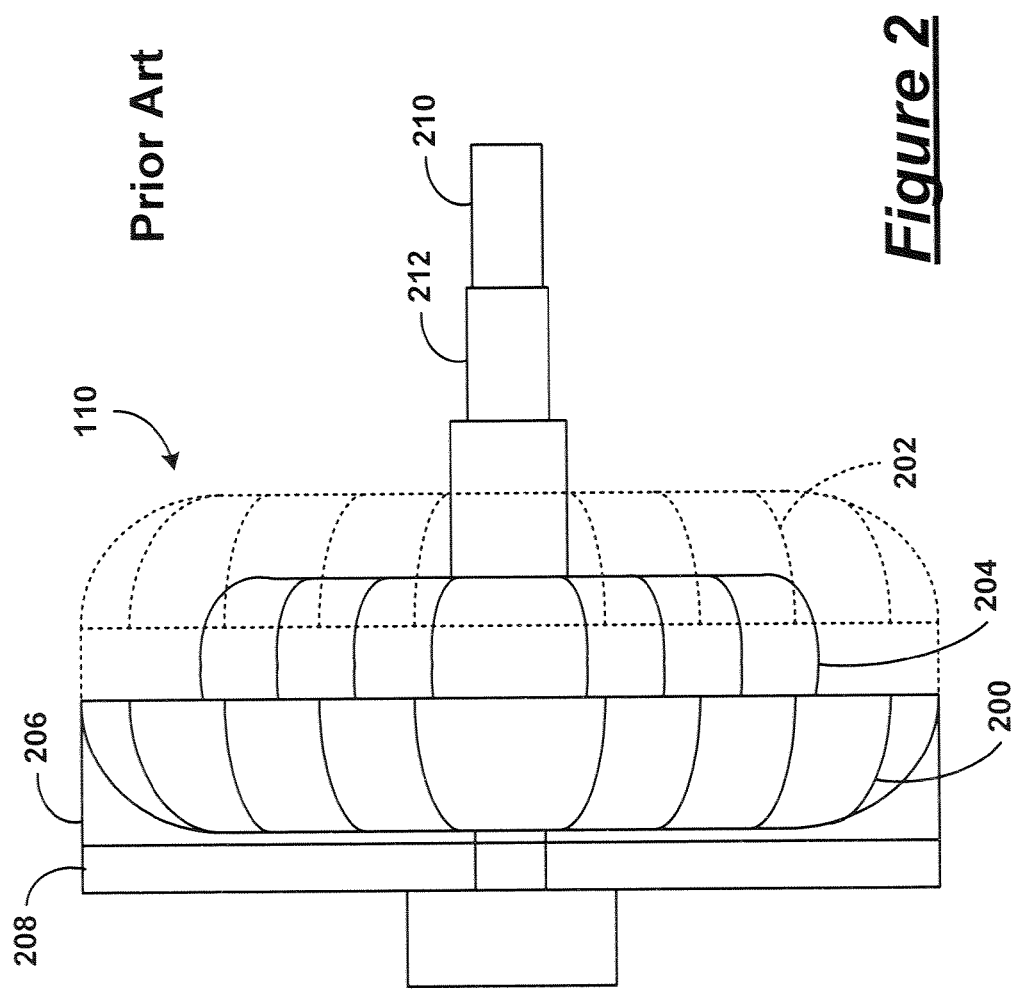

Turning now to FIG. 2, a typical torque converter 110 is made up of a turbine 200, a pump 202, a stator 204, and transmission fluid. The housing 206 of the torque converter 110 is bolted to the flywheel 208 of the engine, and thus turns at the same speed as the engine. The fins that make up the pump 202 of the torque converter 110 are attached to the housing 206, so they also turn at the same speed as the engine.

The pump 202 inside a torque converter is a type of centrifugal pump. As it spins, fluid is flung to the outside. As fluid is flung to the outside, a vacuum is created that draws more fluid in at the center. The fluid then enters the blades of the turbine 200, which is connected to the transmission by turbine output shaft 210. The turbine 200 causes the transmission to spin, which moves the vehicle. Since the blades of the turbine 200 are curved, the fluid, which enters the turbine 200 from the outside, has to change direction before it exits the center of the turbine 200. This directional change causes the turbine 200 to spin.

The fluid exits the turbine 200 at the center, moving in a different direction than when it entered. The fluid exits the turbine 200 moving in an opposite direction than one in which the pump 202 (and engine) are turning. If the fluid were allowed to hit the pump 202, it would slow the engine down, wasting power. Therefore, a torque converter 110 has a stator 204 to prevent this waste of power.

The stator 204 resides in the very center of the torque converter 110. It is connected to a fixed shaft in the transmission by stator output shaft 212. The job of the stator 204 is to redirect the fluid returning from the turbine 200 before it hits the pump 202 again. This redirection dramatically increases the efficiency of the torque converter 110.

In some cases, there can be a lock-up clutch, which can create a firm connection between the pump 202 and turbine 200. The clutch is usually only engaged when a speed ratio of 1:1 has been achieved between turbine 200 and pump 202.

Figure 3:
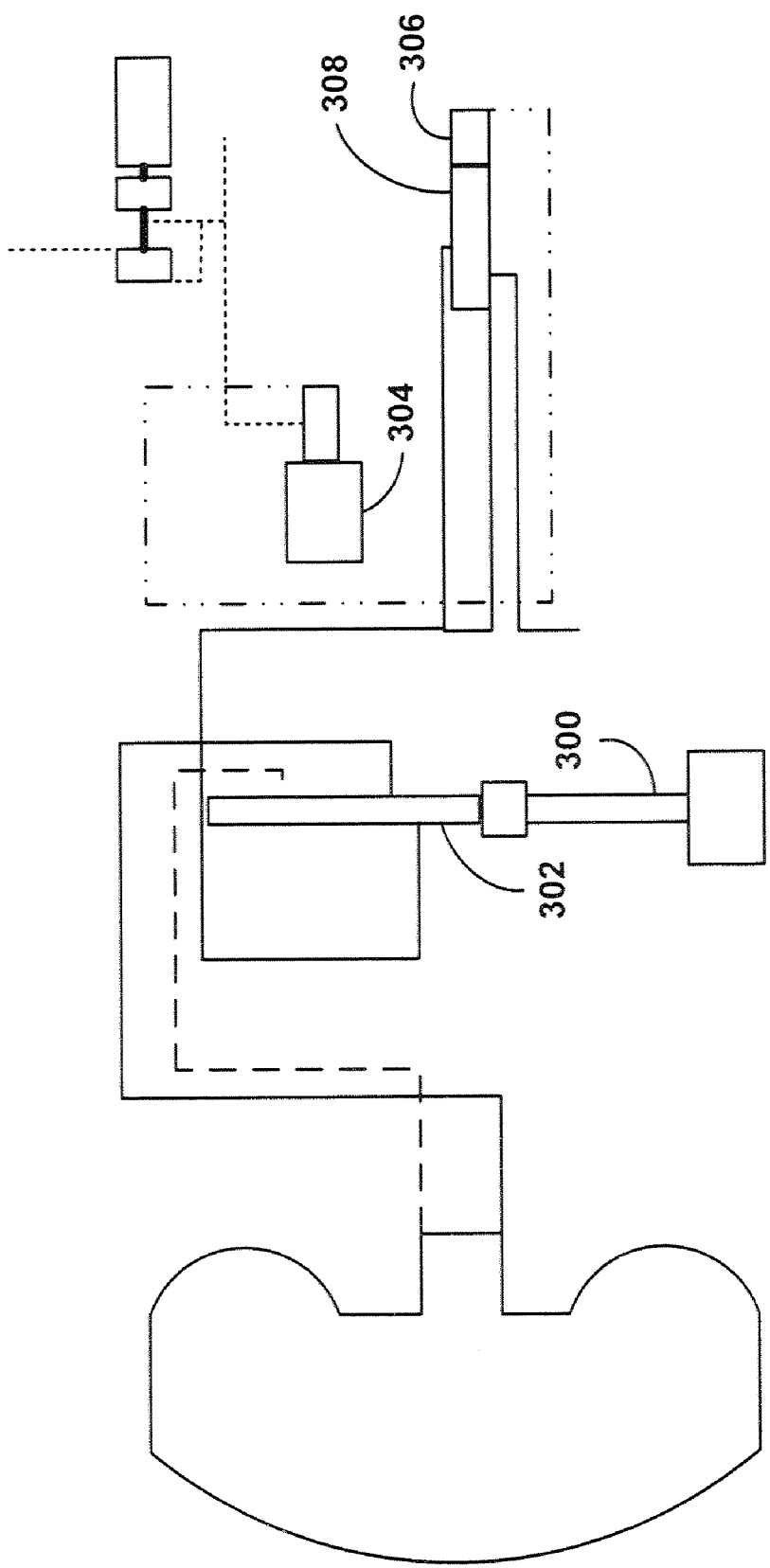

Turning now to FIG. 3, strategies for delivering power directly from the crankshaft into an automatic transmission have ranged from a purely mechanical connection via a high clutch drum and shaft transmitted through a damper plate assembly, to an actual clutch apply, all taking place inside the torque converter's fluid coupling. The converter clutch apply method has been the strategy of choice among vehicle manufacturers. This strategy has gone through several changes through the years. Some previous strategies have used a simple ON/OFF solenoid 300 in conjunction with an encapsulated check ball assembly 302 at the tip of the input shaft. The solenoid 300 turns the clutch on and off while the check ball assisted in a controlled apply of the clutch.

In more recent strategies, a pulse width modulated (PWM) torque converter clutch (TCC) solenoid 304 is added to the system in order to enhance converter clutch engagement for improved fuel economy. A powertrain control module (PCM) provides a duty cycle to this pulse width modulated (PWM) solenoid 304, which in turn regulates the pressure in the TCC hydraulic circuit, allowing the torque converter clutch to apply gradually. As apply pressure is increased, slip is also increased proportionally. Therefore, the amount of slip that occurs during the apply is proportional to the duty cycle.

The construction of the PWM solenoid 304 is such that when the solenoid 304 is completely turned off, feed pressure (AFL) to the solenoid 304 is blocked at the solenoid 304. When the solenoid 304 is duty-cycled, it opens to a circuit that allows pressure to act on the isolator valve 306. This increases the spring tension acting on the TCC regulator valve 308, which then increases regulated TCC apply pressure. As the duty cycle decreases, the regulated apply pressure decreases. As the duty cycle increases, so does the regulated apply pressure. As mentioned above, more pressure equals less slip and visa versa. The relationship between fluid apply pressure and input of the pressure control solenoid is essentially linear, and can be described by the following equation:

$$y = mx + b;$$

where y is fluid apply pressure, a is gain of the regulator valve, x is input of the pressure control solenoid, and b is offset of the solenoid spring.

SUMMARY

A torque converter clutch slip rate monitoring system includes a slip rate calculation module that receives a raw slip speed of a torque converter clutch and that calculates torque converter clutch slip acceleration based on the raw slip speed. A torque converter clutch slip rate monitoring module detects deviation of the slip acceleration from a predetermined range during a pulldown of the torque converter clutch.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
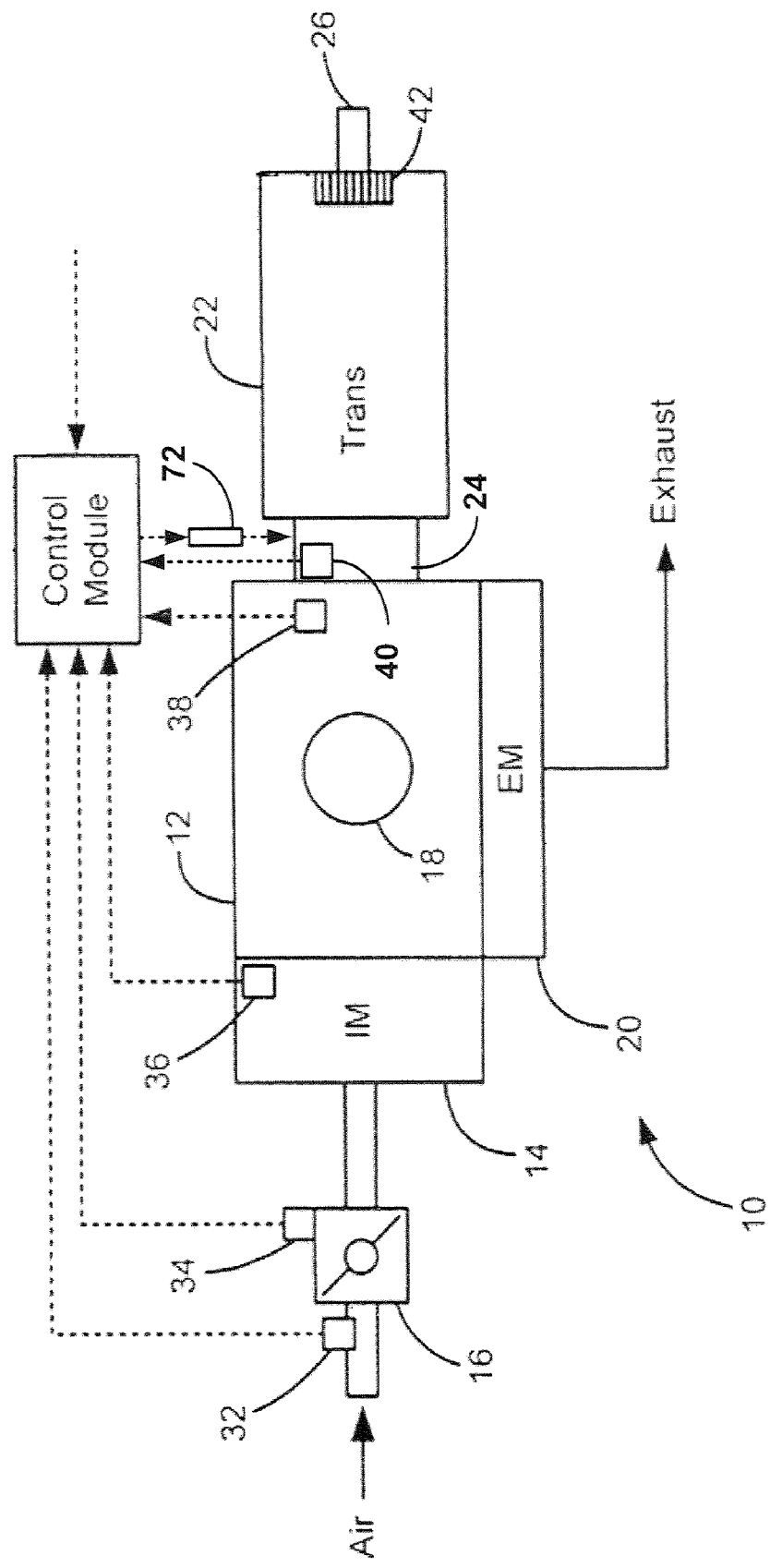
Figure 5:
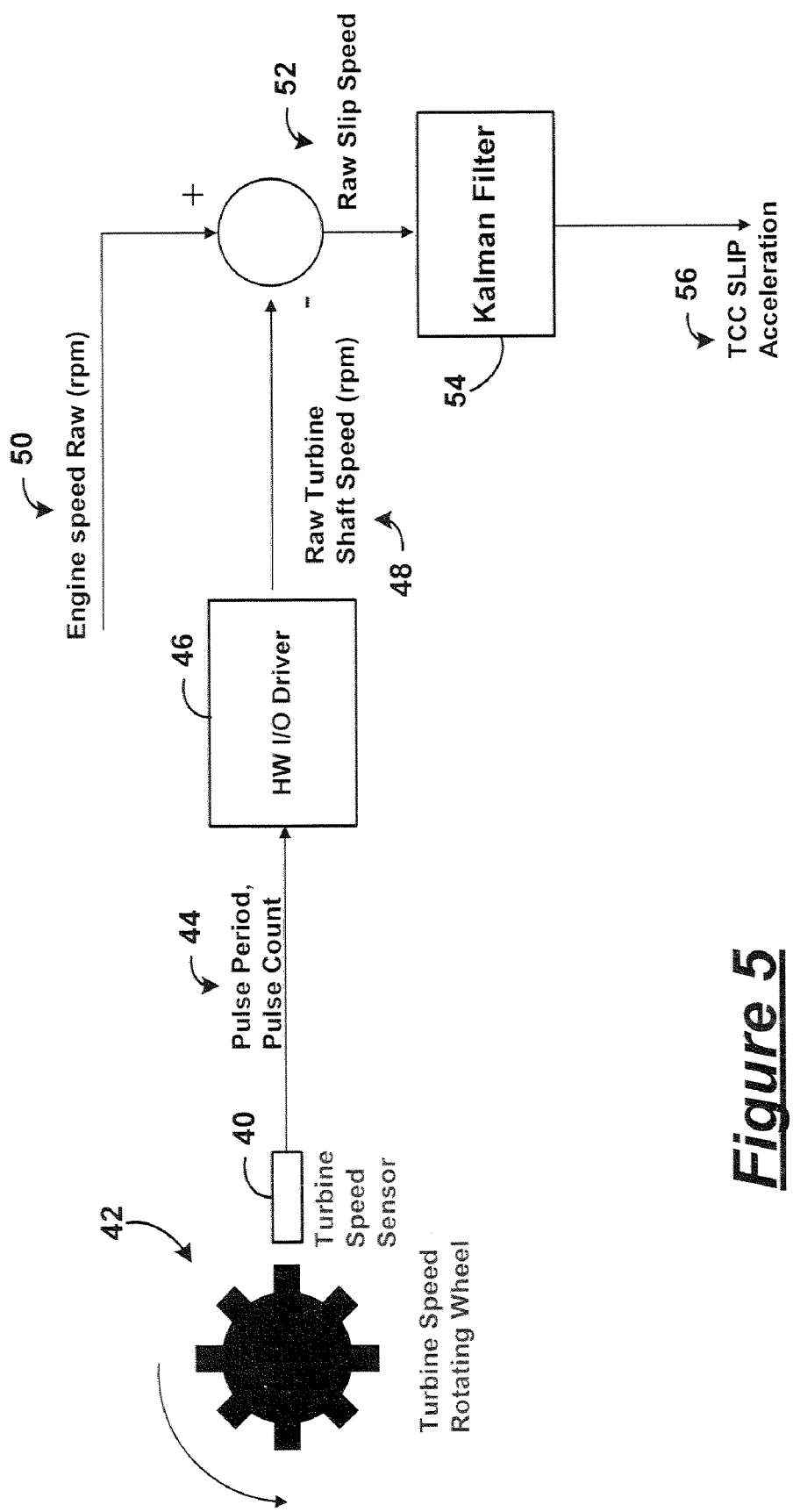
Figure 6:
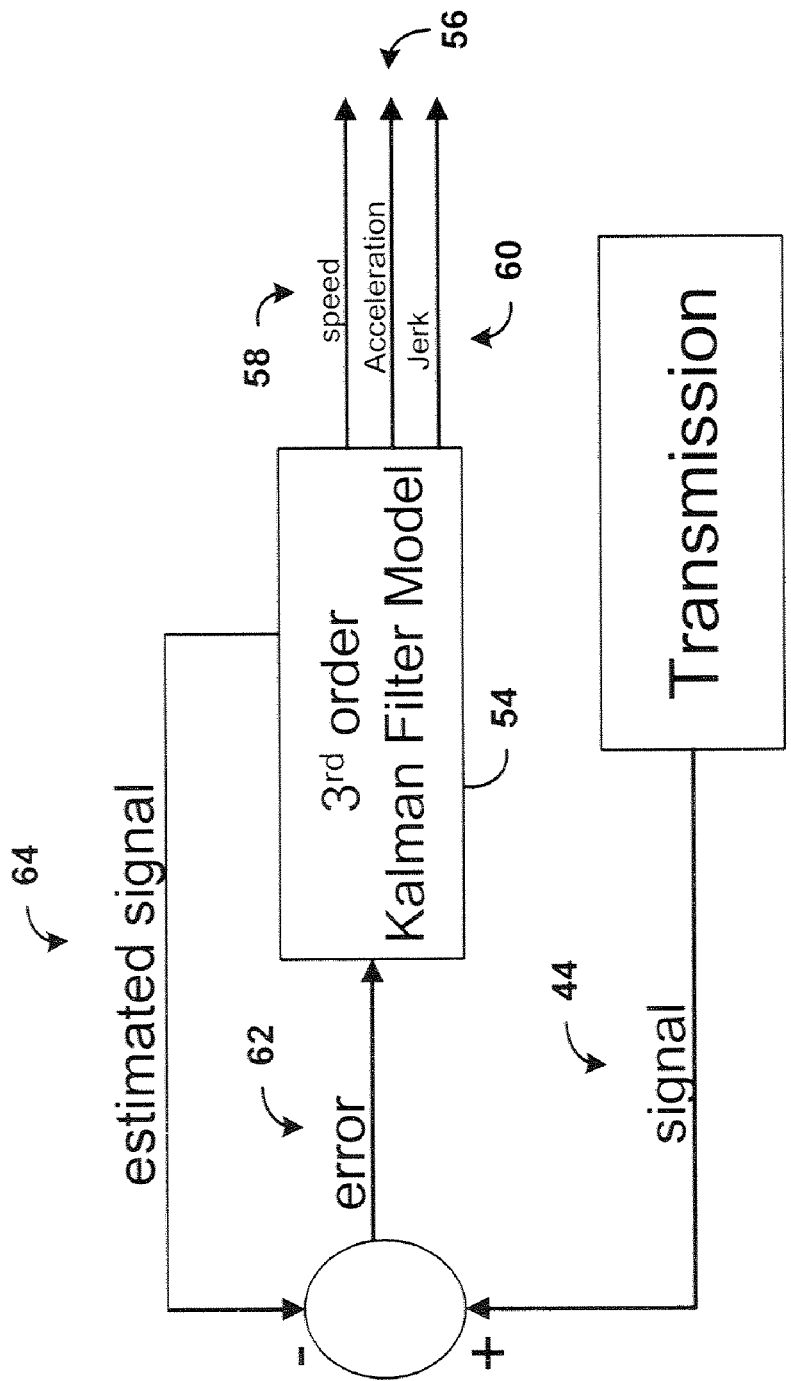
Figure 7:
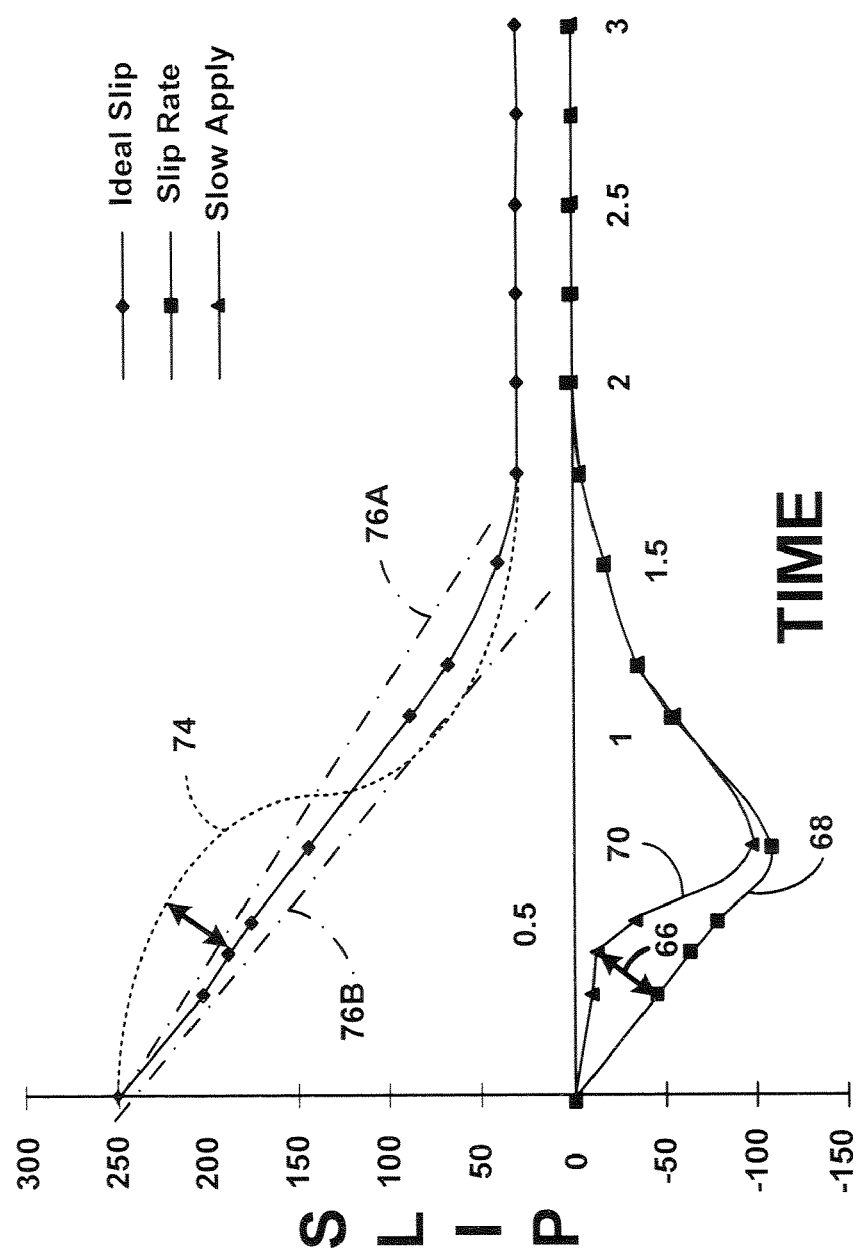
Figure 8:
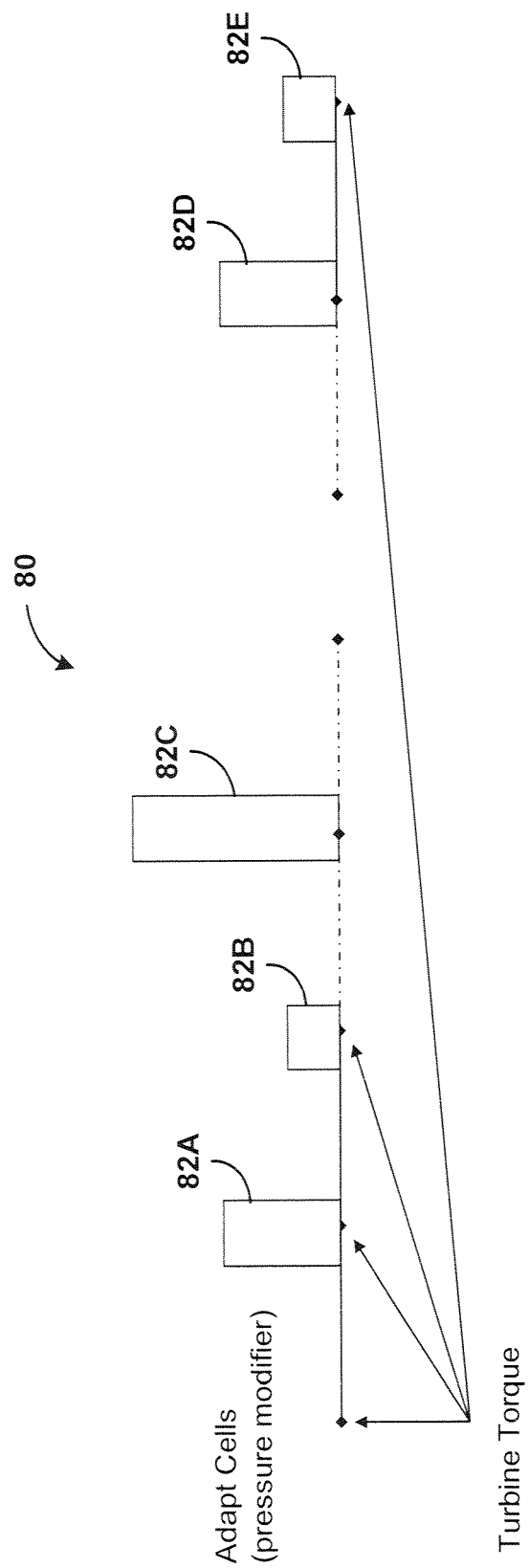

FIG. 1 is a diagram illustrating a vehicle.
FIG. 2 is a diagram of a torque converter.
FIG. 3 is a block diagram illustrating a torque converter apply pressure control assembly.
FIG. 4 is a block diagram illustrating a TCC apply adapt update system.
FIG. 5 is a block diagram illustrating TCC slip acceleration calculation.
FIG. 6 is a block diagram illustrating TCC slip acceleration calculation by a third order Kalman filter.
FIG. 7 is a graphical representation illustrating TCC apply adapt update calculation to arrive at an ideal slip.
FIG. 8 is a graphical representation illustrating adapt cells arrayed by turbine torque.

Figure 9:
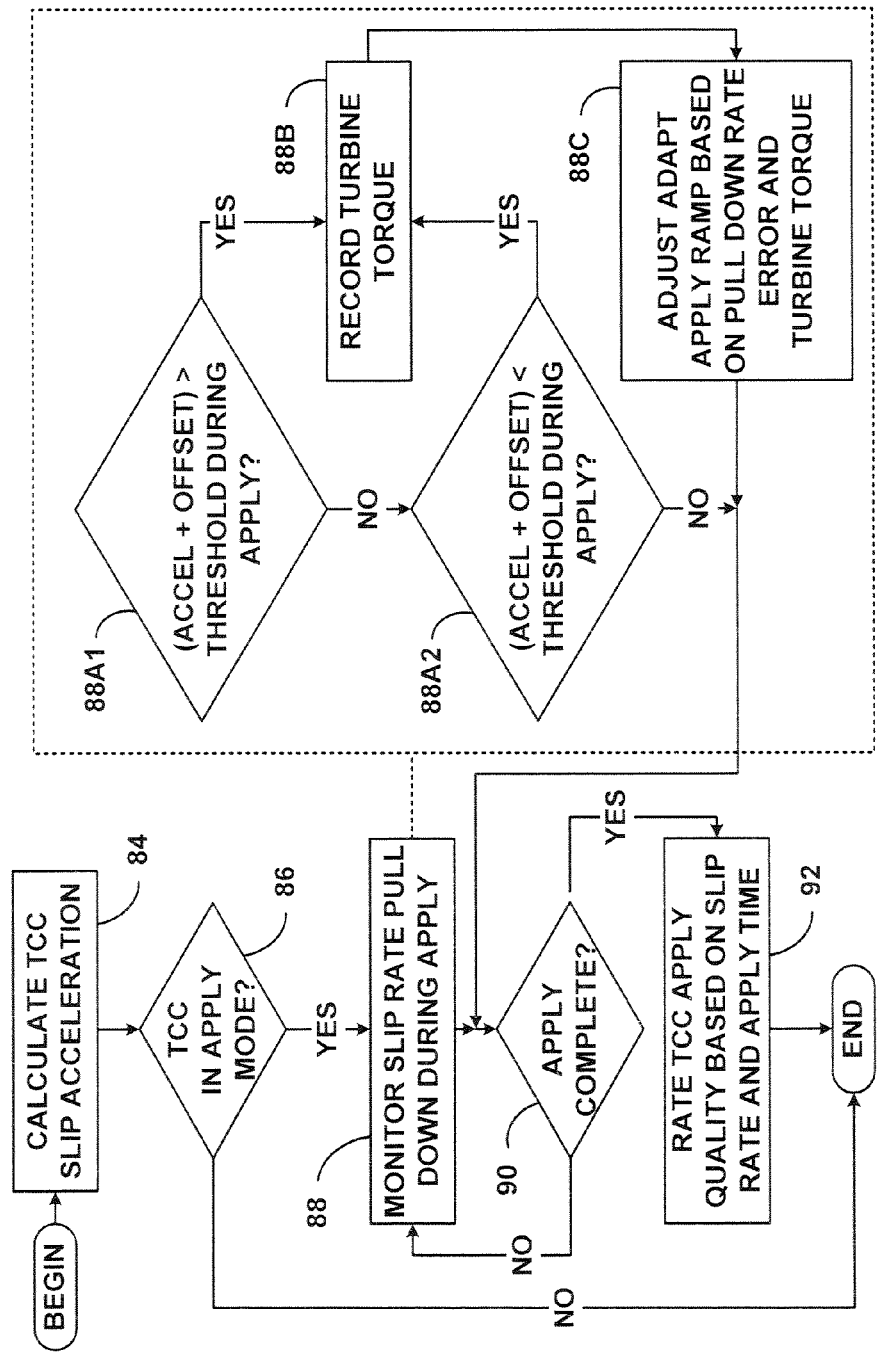

FIG. 9 is a flow diagram illustrating a TCC apply adapt update method.

DETAILED DESCRIPTION

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The slip rate monitoring system and method according to the present invention can be implemented in various ways. For example, the slip rate monitoring system and method can include or employ a third order Kalman filter. Alternatively or additionally, the slip rate monitoring system and method can include or employ a rating module to rate torque converter clutch performance in order to provide feedback to system designers. Alternatively or additionally, the slip rate monitoring system and method can be employed as a component of a torque converter clutch apply adapt update system and method. Moreover, it should be readily understood that these embodiments can be combined to accomplish a torque converter clutch apply adapt update system that employs a third order Kalman filter and includes a rating module. Therefore, it should also be readily understood that, although the slip rate monitoring system and method is described below with respect to such a combination, the slip rate monitoring system and method is not embodied solely in such a combination.

Referring now to FIGS. 4-6, an exemplary vehicle system 10 includes an engine 12 that generates drive torque. More specifically, air is drawn into an intake manifold 14 through a throttle 16. The air is mixed with fuel, and the fuel and air mixture is combusted within a cylinder 18 to reciprocally drive a piston (not shown), which rotatably drives a crankshaft (not shown). Exhaust, resulting from the combustion process, is exhausted through an exhaust manifold 20, is treated in an after-treatment system (not shown) and is released to atmosphere.

The crankshaft drives an automatic transmission 22 through a torque converter 24. The transmission 22 includes an input shaft (not shown) and an output shaft 26, which transmits drive torque through a driveline (not shown) to rotatably drive a wheel or wheels 28.

A control module 30 regulates overall operation of the vehicle system 10. More specifically, the control module 30 receives vehicle operating parameter signals from a plurality of sensors and controls the system 10 based thereon. Exemplary sensors include a mass air flow (MAF) sensor 32, a throttle position sensor 34, a manifold absolute pressure (MAP) sensor 36 and an engine RPM sensor 38.

The sensors also include a turbine speed sensor 40 that generates a signal based on the rotation of the turbine of the torque converter 24. More specifically, the turbine speed sensor 40 is responsive to a toothed wheel 42 that is fixed for rotation with the turbine output shaft. The turbine speed sensor 40 generates a pulse signal or output shaft signal (OSS) 44, wherein the pulses correspond to the rising and falling edges of the teeth of the toothed wheel 42. The OSS 44 is transmitted to the control module 30.

In the control module 30, a hardware input/output driver 46 processes the OSS 44 pulse period and pulse count to obtain a raw turbine shaft speed 48, which is then compared to raw engine speed 50 to obtain a raw slip speed 52. This raw slip speed serves as input to a $3^{rd}$ order Kalman filter 54, which calculates the TCC slip acceleration 56. In addition to the slip acceleration 56, the Kalman filter 54 also calculates speed 58 and jerk 60. During this process, filter 54 calculates error 62 by comparing the measured OSS to an estimated OSS. The process of the Kalman filter can be described by the following equations:

Error=raw measured signal−estimated signal;

$E(k)=Y(k)-X1(k-1)$;

$X1(K)=X1(K-1)+T*X2(k-1)+E(k)*K1$;

$X2(K)=X2(K-1)+T*X3(k-1)+E(k)*K2$;

$X3(K)=X3(K-1)+E(k)*K3$;

Y(k): measured raw signal from the sensor;
X1: Estimated signal;
X2: Estimated acceleration;
X3: Estimated acceleration derivative (Jerk);
T: Filter sampling period.

As mentioned above, measured raw signal is equal to:

TCC Slip raw=Engine rpm raw−Turbine speed raw.

Turning now to FIGS. 7-8, the TCC apply adapt update system is able to determine a difference 66 between a desired slip rate 68 and an actual slip rate 70 occurring as a result of a slow apply. The system employs this difference 66 to adapt the apply pressure rate at the solenoid 72 (FIG. 4) in order to adjust an actual slip 74 to be within upper and lower bounds 76A-B in order to achieve an ideal slip curve 78. In other words, the system first utilizes a third order Kalman filter to calculate torque acceleration of converter slip. Then, if the rate of change of the slip value during an apply is less than desired, then adapt apply pressure rate is updated based on apply turbine torque in order to reduce apply pressure rate. On the other hand, if the rate of change of the slip value during the apply is greater than desired, then the adapt apply pressure rate is updated based on apply turbine torque in order to increase apply pressure rate. To this end, the system employs an adapt cell map 80 having adapt cells arrayed by turbine torque. The system monitors the slip rate during a pulldown while using the update cells 82A-E of the map 80 obtained during an immediately previous pulldown. Then, the cells 82A-E are updated for use in a next pulldown.

The amount of adapt correction is a function of slip rate error (slip rate−threshold).

Adapt_Ramp=Adapt_Ramp+correction term;

TCC Apply Pressure=TCC Operting point+Ramp+ Adapt_Ramp+On_Ramp.

Torque converter clutch apply is a function of torque converter slip rate of change and is looked up once per apply. Apply thresholds are predetermined calibrations.

Turning now to FIG. 9, a TCC apply adapt update method begins by calculating TCC slip acceleration at step 84 using the third order Kalman filter. If the TCC is in the apply mode as at decision step 86, then slip rate pulldown is monitored during the apply at step 88. For example, if the offset adjusted slip acceleration falls above or below predefined thresholds during the apply as at decision steps 88A1 and 88A2, then the highest or lowest peak value of acceleration slip can be recorded, along with the turbine torque during the pulldown at step 88B. In other words, if slip acceleration during the apply is outside the nominal range, then the TCC apply pressure adapt correction is required. The pressure adapt cells are a (17 cells) table function of turbine torque, Cell(x)=Cell(x)+adapt correction.

The adapt apply ramp can be adjusted according to the pulldown rate error and turbine torque at step 88C. Based on the highest or lowest peak value of TCC slip acceleration, a signed pressure modifier correction can be added to the adapt cell (increase or decrease) at the corresponding turbine torque. The TCC pressure correction modifier value is looked up from a predetermined calibration table. This update of the apply adapt cells can be performed during the apply ramp or after completion of the pulldown. Even of several cells are incorrect, iterative update of the most incorrect cell over several pulldowns can arrive deliberately and accurately at a slip rate within a predetermined range of acceptability for the entire pulldown. However, it should also be readily understood that additional or alternative embodiments can update more than one cell after a pulldown, including some or all of the cells that, when used to accomplish the pulldown, result in a significant deviation from the ideal slip acceleration for their respective turbine torque values.

Once the apply is determined to be complete at decision step 90, then the TCC apply quality can be rated based on the slip rate and the apply time at step 92 in order to provide feedback to system designers. In particular, based on TCC slip acceleration, the pulldown can be rated based on a predetermined TCC slip acceleration vs. TCC quality rating table. This rating can be a real time feedback to the engineer that can be used during the development phase of the product.

The TCC apply adapt update system and method yields several accomplishments. For example, it accomplishes real time adaptation of torque converter clutch apply that can be derived with good accuracy and repeatability. Also, it serves as an aid to calibration engineers in GMUT quantifying TCC applies. Additionally, it accomplishes go/no-no testing for transmission misbuilds at assembly plants. Further, it increases long term torque converter durability.

Returning now to FIG. 4, it should be readily understood that control module 30 can have various functional modules for carrying out the functions of the system and steps of the method. For example, control module 30 can have a slip rate calculation module, such as a third order Kalman filter, calculating torque converter clutch slip acceleration as a function of raw slip speed of a torque converter clutch. Also, control module 30 can have a torque converter clutch slip rate monitoring module in communication with the slip rate calculation module and operating to: (1) detect a deviation of the slip acceleration from an acceptable range during a pulldown of the torque converter clutch; and (2) record a value of the deviation together with a turbine torque at which the deviation occurred.

In some embodiments, control module 30 can have an apply adapt cell update module in communication with the monitoring module and operating to perform an adjustment to an apply adapt cell in computer readable memory that is employed to accomplish the pulldown. The cell being adapted can correspond to the turbine torque at which the deviation occurred. The adjustment can be performed in order to decrease the deviation during a subsequent pulldown.

In some embodiments, the monitoring module can compare the slip acceleration during the pulldown of the torque converter clutch to predetermined thresholds defining the range of acceptable slip acceleration and, if the slip acceleration is found to be unacceptable, record a value of greatest deviation of the slip acceleration outside of the range of acceptable slip acceleration along with the corresponding turbine torque at which the value of greatest deviation occurred. In these and additional or alternative embodiments, the update module can add a signed pressure modifier correction to the apply adapt cell corresponding to the turbine torque at which the greatest deviation occurred by retrieving a value of the signed pressure modifier correction from a predetermined calibration table by the value of the greatest deviation.

Additional components of control module 30 can include a computer readable memory storing a data structure containing apply adapt cells arranged according to turbine torque. Similarly, control module 30 can include a powertrain control module in communication with the memory and employing the adapt cells to adjust control of a solenoid governing fluid pressure in the torque converter clutch during a pulldown of the torque converter clutch. The solenoid 72 can be in communication with this powertrain control module and responsive to control by the powertrain control module to govern fluid pressure in the torque converter clutch.

Also, control module 30 can have a raw slip speed calculation module in communication with the third order Kalman filter and calculating the raw slip speed by comparing a turbine speed to an engine speed. Turbine speed sensor 40 can be in communication with this raw slip speed calculation module, and can operate to detect speed of the turbine of the torque converter clutch and generate a signal indicating the raw turbine speed. Similarly, engine speed sensor 38 can be in communication with the raw slip speed calculation module, and can operate to detect engine speed and generate a signal indicating engine speed.

In additional or alternative embodiments, another functional module that can be included in control module 30 can be a rating module generating a rating of torque converter clutch apply quality in order to provide feedback to system designers. In some embodiments, the pulldown can be rated as a function of slip rate and apply time with reference to a slip acceleration versus torque converter clutch quality rating table. This rating can be stored in computer readable memory for reference by system designers, and/or communicated to system designers by a user interface. It should be readily understood that the rating module can alternatively be separate from the control module 30, such as in the case of a computer workstation receiving the slip acceleration data into computer readable memory and producing the rating for the system designers.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A torque converter clutch slip rate monitoring system, comprising:
    a slip rate calculation module that receives a raw slip speed of a torque converter clutch and that calculates torque converter clutch slip acceleration based on the raw slip speed;
    a torque converter clutch slip rate monitoring module that detects deviation of the slip acceleration from a predetermined range during a pulldown of the torque converter clutch; and
    an apply adapt cell update module that performs an adjustment to an apply adapt cell, wherein the cell being adapted corresponds to a turbine torque at which the deviation occurred.

2. The system of claim 1, further comprising a data structure that stores apply adapt cells arranged according to turbine torque.

3. The system of claim 2, further comprising a powertrain control module that employs the adapt cells to adjust control of a solenoid governing fluid pressure of the torque converter clutch.

4. The system of claim 2, further comprising a solenoid governing fluid pressure in the torque converter clutch.

5. The system of claim 1, wherein said monitoring module compares the slip acceleration during the pulldown of the torque converter clutch to predetermined thresholds defining the predetermined range of slip acceleration and, if the slip acceleration deviates from the range, records a value of greatest deviation along with the corresponding turbine torque at which the value of greatest deviation occurred.

6. The system of claim 5, wherein said update module adds a signed pressure modifier correction to the apply adapt cell corresponding to the turbine torque at which the greatest deviation occurred, wherein a value of the signed pressure modifier correction is retrieved from a predetermined calibration table by the value of the greatest deviation.

7. The system of claim 1, further comprising a rating module that generates a rating of torque converter clutch apply quality.

8. The system of claim 7, wherein said rating module rates the pulldown based on slip rate and apply time with reference to a slip acceleration versus torque converter clutch quality rating table.

9. The system of claim 1, further comprising a raw slip speed calculation module that calculates the raw slip speed by comparing a turbine speed to an engine speed.

10. The system of claim 9, further comprising a turbine shaft speed sensor that detects speed of a turbine shaft of the torque converter clutch.

11. The system of claim 9, further comprising an engine speed sensor that detects engine speed.

12. The system of claim 1, wherein said slip rate calculation module is a third order Kalman filter.

13. The system of claim 12, wherein said third order Kalman filter calculates speed, slip acceleration, and jerk, and calculates error by comparing a measured slip speed to an estimated slip speed, all in accordance with the following:

Error=raw measured signal−estimated signal;

$E(k)=Y(k)-X1(k-1)$;

$X1(K)=X1(K-1)+T*X2(k-1)+E(k)*K1$;

$X2(K)=X2(K-1)+T*X3(k-1)+E(k)*K2$;

$X3(K)=X3(K-1)+E(k)*K3$;

Y(k): measured raw signal from a sensor;
X1: Estimated signal;
X2: Estimated acceleration;
X3: Estimated acceleration derivative (Jerk);
T: Filter sampling period; and TCC Slip raw=Engine rpm raw−Turbine speed raw.

14. A torque converter clutch slip rate monitoring method, comprising:
receiving a signal indicative of a raw slip speed of a torque converter clutch;
calculating torque converter clutch slip acceleration as a function of the raw slip speed of the torque converter clutch;
detecting a deviation of the slip acceleration from a predetermined range during a pulldown of the torque converter clutch; and
performing an adjustment to an apply adapt cell, wherein the cell being adapted corresponds to a turbine torque at which the deviation occurred.

15. The method of claim 14, further comprising employing a data structure that stores apply adapt cells arranged according to turbine torque.

16. The method of claim 15, further comprising employing the adapt cells to adjust control of a solenoid governing fluid pressure in the torque converter clutch.

17. The method of claim 16, further comprising controlling the solenoid to govern fluid pressure in the torque converter clutch.

18. The method of claim 14, further comprising:
comparing the slip acceleration to predetermined thresholds defining the predetermined range of slip acceleration; and
if the slip acceleration deviates from the range, recording a value of greatest deviation of the slip acceleration along with the corresponding turbine torque at which the value of greatest deviation occurred.

19. The method of claim 18, further comprising:
retrieving a value of a signed pressure modifier correction from a predetermined calibration table by the value of the greatest deviation; and
adding the signed pressure modifier correction to the apply adapt cell corresponding to the turbine torque at which the greatest deviation occurred.

20. The method of claim 14, further comprising generating a rating of torque converter clutch apply quality.

21. The method of claim 20, further comprising rating the pulldown based on slip rate and apply time with reference to a slip acceleration versus torque converter clutch quality rating table.

22. The method of claim 14, further comprising calculating the raw slip speed by comparing a turbine speed to an engine speed.

23. The method of claim 22, further comprising employing a turbine shaft speed sensor to detect speed of a turbine shaft of the torque converter clutch.

24. The method of claim 22, further comprising employing an engine speed sensor to detect engine speed.

25. The method of claim 14, further comprising employing a third order Kalman filter to calculate the torque converter clutch slip acceleration.

26. The method of claim 25, wherein said third order Kalman filter calculates speed, slip acceleration, and jerk, and calculates error by comparing a measured slip speed to an estimated slip speed, all in accordance with the following:

Error=raw measured signal−estimated signal;

$E(k)=Y(k)-X1(k-1)$;

$X1(K)=X1(K-1)+T*X2(k-1)+E(k)*K1$;

$X2(K)=X2(K-1)+T*X3(k-1)+E(k)*K2$;

$X3(K)=X3(K-1)+E(k)*K3$;

Y(k): measured raw signal from a sensor;
X1: Estimated signal;
X2: Estimated acceleration;
X3: Estimated acceleration derivative (Jerk);
T: Filter sampling period; and TCC Slip raw=Engine rpm raw−Turbine speed raw.

* * * * *